US008699330B2

(12) United States Patent
Katibian et al.

(10) Patent No.: US 8,699,330 B2
(45) Date of Patent: Apr. 15, 2014

(54) SYSTEMS AND METHODS FOR DIGITAL DATA TRANSMISSION RATE CONTROL

(75) Inventors: Behnam Katibian, Irvine, CA (US); George A. Wiley, San Diego, CA (US); Brian Steele, Denver, CO (US)

(73) Assignee: QUALCOMM Incorporated, San Diego, CA (US)

( * ) Notice: Subject to any disclaimer, the term of this patent is extended or adjusted under 35 U.S.C. 154(b) by 580 days.

(21) Appl. No.: 11/285,505

(22) Filed: Nov. 23, 2005

(65) Prior Publication Data

US 2006/0171414 A1 Aug. 3, 2006

Related U.S. Application Data

(60) Provisional application No. 60/630,853, filed on Nov. 24, 2004, provisional application No. 60/631,549, filed on Nov. 30, 2004, provisional application No. 60/632,825, filed on Dec. 2, 2004, provisional application No. 60/632,852, filed on Dec. 2, 2004, provisional application No. 60/633,071, filed on Dec. 2, 2004, provisional application No. 60/633,084, filed on Dec. 2, 2004.

(51) Int. Cl.
*H04J 1/16* (2006.01)
(52) U.S. Cl.
USPC ......... 370/230; 370/230.1; 370/277; 370/544
(58) Field of Classification Search
USPC .............. 370/468, 391, 470, 230, 232, 230.1, 370/277, 577
See application file for complete search history.

(56) References Cited

U.S. PATENT DOCUMENTS

| 3,594,304 | A | | 7/1971 | Seitzer et al. |
| 4,042,783 | A | | 8/1977 | Gindi |
| 4,363,123 | A | * | 12/1982 | Grover ............................ 377/28 |
| 4,393,444 | A | | 7/1983 | Weinberg |
| 4,491,943 | A | | 1/1985 | Iga et al. |
| 4,660,096 | A | * | 4/1987 | Arlan et al. ................... 386/326 |

(Continued)

FOREIGN PATENT DOCUMENTS

| CN | 88101302 A | 10/1988 |
| CN | 1234709 A | 11/1999 |

(Continued)

OTHER PUBLICATIONS

VESA; ( MDDI Standard, 2003); pp. 80-160.*

(Continued)

*Primary Examiner* — Ricky Ngo
*Assistant Examiner* — Dewanda Samuel
(74) *Attorney, Agent, or Firm* — Nicholas J. Pauley; Peter Michael Kamarchik; Joseph Agusta

(57) ABSTRACT

The present invention provides systems and methods for adaptive digital data transmission rate control. A digital data transmission system for adaptively transferring packets over a transmission link includes a client device having a bandwidth control module and a host device coupled to the client device over the transmission link. The host device includes one or more bandwidth control registers and a packet builder. The bandwidth control module determines a packet speed and/or size for packets transmitted from the host device to the client device over the transmission link. The bandwidth control registers store the requested packet size and/or rate. The packet builder accesses these registers when transmitting packets to determine the requested packet size and/or rate.

8 Claims, 8 Drawing Sheets

(56) References Cited

U.S. PATENT DOCUMENTS

| | | | |
|---|---|---|---|
| 4,764,805 A * | 8/1988 | Rabbani et al. | 375/240.01 |
| 4,769,761 A * | 9/1988 | Downes et al. | 709/224 |
| 4,812,296 A | 3/1989 | Schmelz et al. | |
| 4,821,296 A | 4/1989 | Cordell | |
| 4,891,805 A * | 1/1990 | Fallin | 370/229 |
| 5,079,693 A | 1/1992 | Miller | |
| 5,111,455 A | 5/1992 | Negus | |
| 5,131,012 A | 7/1992 | Dravida | |
| 5,138,616 A * | 8/1992 | Wagner et al. | 714/704 |
| 5,155,590 A | 10/1992 | Beyers, II et al. | |
| 5,167,035 A | 11/1992 | Mann et al. | |
| 5,224,213 A | 6/1993 | Dieffenderfer et al. | |
| 5,227,783 A | 7/1993 | Shaw et al. | |
| 5,231,636 A | 7/1993 | Rasmussen | |
| 5,331,642 A * | 7/1994 | Valley et al. | 714/705 |
| 5,345,542 A | 9/1994 | Wye | |
| 5,359,595 A | 10/1994 | Weddle et al. | |
| 5,377,188 A | 12/1994 | Seki | |
| 5,396,636 A | 3/1995 | Gallagher et al. | |
| 5,418,452 A | 5/1995 | Pyle | |
| 5,418,952 A | 5/1995 | Morley et al. | |
| 5,420,858 A | 5/1995 | Marshall et al. | |
| 5,422,894 A * | 6/1995 | Abe et al. | 714/755 |
| 5,430,486 A * | 7/1995 | Fraser et al. | 348/426.1 |
| 5,477,534 A | 12/1995 | Kusano | |
| 5,483,185 A | 1/1996 | Scriber et al. | |
| 5,490,247 A | 2/1996 | Tung et al. | |
| 5,502,499 A | 3/1996 | Birch et al. | |
| 5,510,832 A | 4/1996 | Garcia | |
| 5,513,185 A * | 4/1996 | Schmidt | 714/708 |
| 5,519,830 A * | 5/1996 | Opoczynski | 714/4.2 |
| 5,521,907 A | 5/1996 | Ennis, Jr. et al. | |
| 5,524,007 A | 6/1996 | White et al. | |
| 5,530,704 A | 6/1996 | Gibbons et al. | |
| 5,535,336 A | 7/1996 | Smith et al. | |
| 5,543,939 A * | 8/1996 | Harvey et al. | 375/240.02 |
| 5,546,121 A | 8/1996 | Gotanda et al. | |
| 5,550,489 A | 8/1996 | Raab | |
| 5,559,459 A | 9/1996 | Back et al. | |
| 5,559,952 A | 9/1996 | Fujimoto | |
| 5,560,022 A | 9/1996 | Dunstan et al. | |
| 5,565,957 A | 10/1996 | Goto | |
| 5,575,951 A | 11/1996 | Anderson | |
| 5,604,450 A | 2/1997 | Borkar et al. | |
| 5,619,650 A | 4/1997 | Bach et al. | |
| 5,621,664 A | 4/1997 | Phaal | |
| 5,646,947 A | 7/1997 | Cooper et al. | |
| 5,664,948 A | 9/1997 | Dimitriadis et al. | |
| 5,680,404 A | 10/1997 | Gray | |
| 5,726,990 A | 3/1998 | Shimada et al. | |
| 5,732,352 A | 3/1998 | Gutowski et al. | |
| 5,733,131 A | 3/1998 | Park | |
| 5,734,118 A | 3/1998 | Ashour et al. | |
| 5,751,445 A | 5/1998 | Masunaga | |
| 5,751,951 A | 5/1998 | Osborne et al. | |
| 5,777,999 A | 7/1998 | Hiraki et al. | |
| 5,790,551 A | 8/1998 | Chan | |
| 5,798,720 A | 8/1998 | Yano et al. | |
| 5,802,351 A | 9/1998 | Frampton | |
| 5,815,507 A * | 9/1998 | Vinggaard et al. | 714/704 |
| 5,816,921 A | 10/1998 | Hosokawa | |
| 5,818,255 A | 10/1998 | New et al. | |
| 5,822,603 A | 10/1998 | Hansen et al. | |
| 5,844,918 A | 12/1998 | Kato | |
| 5,847,752 A * | 12/1998 | Sebestyen | 348/14.12 |
| 5,862,160 A | 1/1999 | Irvin et al. | |
| 5,864,546 A | 1/1999 | Campanella | |
| 5,867,501 A | 2/1999 | Horst et al. | |
| 5,867,510 A | 2/1999 | Steele | |
| 5,881,262 A | 3/1999 | Abramson et al. | |
| 5,903,281 A | 5/1999 | Chen et al. | |
| 5,935,256 A | 8/1999 | Lesmeister | |
| 5,953,378 A | 9/1999 | Hotani et al. | |
| 5,958,006 A | 9/1999 | Eggleston et al. | |
| 5,963,557 A | 10/1999 | Eng | |
| 5,963,564 A | 10/1999 | Petersen et al. | |
| 5,963,979 A | 10/1999 | Inoue et al. | |
| 5,969,750 A | 10/1999 | Hsieh et al. | |
| 5,982,362 A | 11/1999 | Crater et al. | |
| 5,983,261 A * | 11/1999 | Riddle | 709/204 |
| 5,990,852 A * | 11/1999 | Szamrej | 345/2.1 |
| 5,990,902 A | 11/1999 | Park | |
| 5,995,512 A | 11/1999 | Pogue, Jr. | |
| 6,002,709 A | 12/1999 | Hendrickson | |
| 6,014,705 A | 1/2000 | Koenck et al. | |
| 6,047,380 A | 4/2000 | Nolan et al. | |
| 6,049,837 A | 4/2000 | Youngman | |
| 6,055,247 A | 4/2000 | Kubota et al. | |
| 6,064,649 A | 5/2000 | Johnston | |
| 6,078,361 A | 6/2000 | Reddy | |
| 6,081,513 A | 6/2000 | Roy | |
| 6,091,709 A | 7/2000 | Harrison et al. | |
| 6,092,231 A | 7/2000 | Sze | |
| 6,097,401 A | 8/2000 | Owen et al. | |
| 6,101,601 A | 8/2000 | Matthews et al. | |
| 6,117,681 A | 9/2000 | Salmons et al. | |
| 6,118,791 A | 9/2000 | Fichou et al. | |
| 6,151,067 A * | 11/2000 | Suemoto et al. | 348/207.99 |
| 6,151,320 A | 11/2000 | Shim et al. | |
| 6,154,156 A | 11/2000 | Tagato | |
| 6,154,466 A | 11/2000 | Iwasaki et al. | |
| 6,185,601 B1 | 2/2001 | Wolff | |
| 6,192,230 B1 | 2/2001 | Van Bokhorst et al. | |
| 6,198,752 B1 | 3/2001 | Lee | |
| 6,199,169 B1 | 3/2001 | Voth et al. | |
| 6,222,677 B1 | 4/2001 | Budd et al. | |
| 6,236,647 B1 | 5/2001 | Amalfitano | |
| 6,242,953 B1 | 6/2001 | Thomas | |
| 6,243,596 B1 | 6/2001 | Kikinis | |
| 6,243,761 B1 | 6/2001 | Mogul et al. | |
| 6,246,876 B1 | 6/2001 | Hontzeas | |
| 6,252,526 B1 | 6/2001 | Uyehara | |
| 6,252,888 B1 | 6/2001 | Fite, Jr. et al. | |
| 6,256,509 B1 | 7/2001 | Tanaka et al. | |
| 6,288,739 B1 | 9/2001 | Hales et al. | |
| 6,297,684 B1 | 10/2001 | Uyehara et al. | |
| 6,308,239 B1 | 10/2001 | Osakada et al. | |
| 6,335,696 B1 | 1/2002 | Aoyagi et al. | |
| 6,359,479 B1 | 3/2002 | Oprescu | |
| 6,363,439 B1 | 3/2002 | Battles et al. | |
| 6,393,008 B1 | 5/2002 | Cheng et al. | |
| 6,397,286 B1 | 5/2002 | Chatenever et al. | |
| 6,400,392 B1 | 6/2002 | Yamaguchi et al. | |
| 6,400,654 B1 | 6/2002 | Sawamura et al. | |
| 6,400,754 B2 | 6/2002 | Fleming et al. | |
| 6,421,735 B1 | 7/2002 | Jung et al. | |
| 6,429,867 B1 | 8/2002 | Deering | |
| 6,430,196 B1 | 8/2002 | Baroudi | |
| 6,430,606 B1 | 8/2002 | Haq | |
| 6,434,187 B1 | 8/2002 | Beard et al. | |
| 6,438,363 B1 * | 8/2002 | Feder et al. | 455/226.4 |
| 6,457,090 B1 | 9/2002 | Young | |
| 6,475,245 B2 | 11/2002 | Gersho et al. | |
| 6,477,186 B1 | 11/2002 | Nakura et al. | |
| 6,480,521 B1 | 11/2002 | Odenwalder et al. | |
| 6,483,825 B2 | 11/2002 | Seta | |
| 6,487,217 B1 | 11/2002 | Baroudi | |
| 6,493,357 B1 | 12/2002 | Fujisaki | |
| 6,493,713 B1 | 12/2002 | Kanno | |
| 6,493,824 B1 * | 12/2002 | Novoa et al. | 713/162 |
| 6,545,979 B1 | 4/2003 | Poulin | |
| 6,549,538 B1 | 4/2003 | Beck et al. | |
| 6,549,958 B1 | 4/2003 | Kuba | |
| 6,574,211 B2 | 6/2003 | Padovani et al. | |
| 6,583,809 B1 * | 6/2003 | Fujiwara | 348/14.12 |
| 6,594,304 B2 | 7/2003 | Chan | |
| 6,609,167 B1 * | 8/2003 | Bastiani et al. | 710/104 |
| 6,611,221 B1 | 8/2003 | Soundarapandian et al. | |
| 6,611,503 B1 | 8/2003 | Fitzgerald et al. | |
| 6,618,360 B1 * | 9/2003 | Scoville et al. | 370/248 |
| 6,621,809 B1 | 9/2003 | Lee et al. | |
| 6,621,851 B1 | 9/2003 | Agee et al. | |
| 6,636,508 B1 | 10/2003 | Li et al. | |
| 6,636,922 B1 | 10/2003 | Bastiani et al. | |

(56) References Cited

U.S. PATENT DOCUMENTS

| | | | |
|---|---|---|---|
| 6,662,322 B1 | 12/2003 | Abdelilah et al. | |
| 6,690,201 B1 | 2/2004 | Simkins et al. | |
| 6,714,233 B2 | 3/2004 | Chihara et al. | |
| 6,715,088 B1 | 3/2004 | Togawa | |
| 6,728,263 B2 * | 4/2004 | Joy et al. | 370/468 |
| 6,738,344 B1 | 5/2004 | Bunton et al. | |
| 6,745,364 B2 | 6/2004 | Bhatt et al. | |
| 6,754,179 B1 | 6/2004 | Lin | |
| 6,760,722 B1 | 7/2004 | Raghunandan | |
| 6,760,772 B2 | 7/2004 | Zou et al. | |
| 6,760,882 B1 | 7/2004 | Gesbert et al. | |
| 6,765,506 B1 | 7/2004 | Lu | |
| 6,771,613 B1 | 8/2004 | O'toole et al. | |
| 6,778,493 B1 | 8/2004 | Ishii | |
| 6,782,039 B2 | 8/2004 | Alamouti et al. | |
| 6,784,941 B1 | 8/2004 | Su et al. | |
| 6,791,379 B1 | 9/2004 | Wakayama et al. | |
| 6,797,891 B1 | 9/2004 | Blair et al. | |
| 6,804,257 B1 | 10/2004 | Benayoun et al. | |
| 6,810,084 B1 | 10/2004 | Jun et al. | |
| 6,813,638 B1 | 11/2004 | Sevanto et al. | |
| 6,816,929 B2 | 11/2004 | Ueda | |
| 6,831,685 B1 | 12/2004 | Ueno et al. | |
| 6,836,469 B1 | 12/2004 | Wu | |
| 6,850,282 B1 | 2/2005 | Makino et al. | |
| 6,865,240 B1 | 3/2005 | Kawataka | |
| 6,865,609 B1 | 3/2005 | Gubbi et al. | |
| 6,865,610 B2 | 3/2005 | Bolosky et al. | |
| 6,867,668 B1 | 3/2005 | Dagostino et al. | |
| 6,882,361 B1 * | 4/2005 | Gaylord | 348/207.1 |
| 6,886,035 B2 | 4/2005 | Wolff | |
| 6,892,071 B2 | 5/2005 | Park et al. | |
| 6,894,994 B1 | 5/2005 | Grob et al. | |
| 6,895,410 B2 | 5/2005 | Ridge | |
| 6,897,891 B2 | 5/2005 | Itsukaichi | |
| 6,906,762 B1 | 6/2005 | Witehira | |
| 6,927,746 B2 * | 8/2005 | Lee et al. | 345/3.2 |
| 6,944,136 B2 | 9/2005 | Kim et al. | |
| 6,947,436 B2 | 9/2005 | Harris et al. | |
| 6,950,428 B1 | 9/2005 | Horst et al. | |
| 6,956,829 B2 | 10/2005 | Lee | |
| 6,973,039 B2 | 12/2005 | Redi et al. | |
| 6,973,062 B1 | 12/2005 | Han | |
| 6,975,145 B1 | 12/2005 | Vadi et al. | |
| 6,990,549 B2 | 1/2006 | Main et al. | |
| 6,993,393 B2 | 1/2006 | Von Arx et al. | |
| 6,999,432 B2 * | 2/2006 | Zhang et al. | 370/328 |
| 7,003,796 B1 | 2/2006 | Humpleman | |
| 7,010,607 B1 | 3/2006 | Bunton | |
| 7,012,636 B2 | 3/2006 | Hatanaka | |
| 7,015,838 B1 | 3/2006 | Groen et al. | |
| 7,023,924 B1 | 4/2006 | Keller et al. | |
| 7,030,796 B2 | 4/2006 | Shim et al. | |
| 7,036,066 B2 | 4/2006 | Weibel et al. | |
| 7,042,914 B2 | 5/2006 | Zerbe et al. | |
| 7,047,475 B2 | 5/2006 | Sharma et al. | |
| 7,051,218 B1 | 5/2006 | Gulick et al. | |
| 7,062,264 B2 | 6/2006 | Ko et al. | |
| 7,062,579 B2 | 6/2006 | Tateyama et al. | |
| 7,068,666 B2 | 6/2006 | Foster et al. | |
| 7,095,435 B1 * | 8/2006 | Hartman et al. | 348/222.1 |
| 7,110,420 B2 | 9/2006 | Bashirullah et al. | |
| 7,126,945 B2 | 10/2006 | Beach | |
| 7,138,989 B2 | 11/2006 | Mendelson et al. | |
| 7,143,177 B1 | 11/2006 | Johnson et al. | |
| 7,143,207 B2 | 11/2006 | Vogt et al. | |
| 7,145,411 B1 | 12/2006 | Blair et al. | |
| 7,151,940 B2 | 12/2006 | Diao | |
| 7,158,536 B2 | 1/2007 | Ching et al. | |
| 7,158,539 B2 | 1/2007 | Zhang et al. | |
| 7,161,846 B2 | 1/2007 | Padaparambil | |
| 7,165,112 B2 | 1/2007 | Battin et al. | |
| 7,178,042 B2 | 2/2007 | Sakagami | |
| 7,180,951 B2 | 2/2007 | Chan | |
| 7,184,408 B2 | 2/2007 | Denton et al. | |
| 7,187,738 B2 | 3/2007 | Naven et al. | |
| 7,191,281 B2 | 3/2007 | Bajikar | |
| 7,219,294 B2 | 5/2007 | Vogt et al. | |
| 7,231,402 B2 | 6/2007 | Dickens | |
| 7,251,231 B2 | 7/2007 | Gubbi | |
| 7,257,087 B2 | 8/2007 | Grovenburg | |
| 7,260,087 B2 | 8/2007 | Bao et al. | |
| 7,269,153 B1 | 9/2007 | Schultz et al. | |
| 7,274,652 B1 * | 9/2007 | Webster et al. | 370/204 |
| 7,278,069 B2 | 10/2007 | Abrosimov et al. | |
| 7,284,181 B1 | 10/2007 | Venkatramani | |
| 7,301,968 B2 | 11/2007 | Haran et al. | |
| 7,310,535 B1 | 12/2007 | MacKenzie et al. | |
| 7,315,265 B2 | 1/2008 | Wiley et al. | |
| 7,315,520 B2 | 1/2008 | Xue et al. | |
| 7,317,754 B1 | 1/2008 | Remy et al. | |
| 7,327,735 B2 | 2/2008 | Robotham et al. | |
| 7,336,139 B2 | 2/2008 | Blair et al. | |
| 7,336,667 B2 | 2/2008 | Allen et al. | |
| 7,340,548 B2 | 3/2008 | Love et al. | |
| 7,349,973 B2 | 3/2008 | Saito et al. | |
| 7,373,155 B2 | 5/2008 | Duan et al. | |
| 7,383,350 B1 * | 6/2008 | Moore et al. | 709/233 |
| 7,383,399 B2 | 6/2008 | Vogt | |
| 7,392,541 B2 | 6/2008 | Largman et al. | |
| 7,403,487 B1 * | 7/2008 | Foladare et al. | 370/252 |
| 7,403,511 B2 | 7/2008 | Liang et al. | |
| 7,405,703 B2 * | 7/2008 | Qi et al. | 343/702 |
| 7,412,642 B2 | 8/2008 | Cypher | |
| 7,430,001 B2 | 9/2008 | Fujii | |
| 7,447,953 B2 | 11/2008 | Vogt et al. | |
| 7,451,362 B2 | 11/2008 | Chen et al. | |
| 7,487,917 B2 | 2/2009 | Kotlarsky et al. | |
| 7,508,760 B2 * | 3/2009 | Akiyama et al. | 370/232 |
| 7,515,705 B2 * | 4/2009 | Segawa et al. | 379/428.01 |
| 7,526,323 B2 | 4/2009 | Kim et al. | |
| 7,536,598 B2 | 5/2009 | Largman et al. | |
| 7,543,326 B2 | 6/2009 | Moni | |
| 7,557,633 B2 | 7/2009 | Yu | |
| 7,574,113 B2 * | 8/2009 | Nagahara et al. | 386/239 |
| 7,595,834 B2 | 9/2009 | Kawai et al. | |
| 7,595,835 B2 | 9/2009 | Kosaka et al. | |
| 7,634,607 B2 * | 12/2009 | Honda | 710/305 |
| 7,643,823 B2 | 1/2010 | Shamoon et al. | |
| 7,729,720 B2 * | 6/2010 | Suh et al. | 455/550.1 |
| 7,800,600 B2 | 9/2010 | Komatsu et al. | |
| 7,813,451 B2 | 10/2010 | Binder et al. | |
| 7,831,127 B2 | 11/2010 | Wilkinson | |
| 7,835,280 B2 | 11/2010 | Pang et al. | |
| 7,844,296 B2 * | 11/2010 | Yuki | 455/556.1 |
| 7,873,343 B2 | 1/2011 | Gollnick et al. | |
| 7,876,821 B2 * | 1/2011 | Li et al. | 375/240.12 |
| 7,877,439 B2 | 1/2011 | Gallou et al. | |
| 7,912,503 B2 * | 3/2011 | Chang et al. | 455/557 |
| 7,945,143 B2 | 5/2011 | Yahata et al. | |
| 7,949,777 B2 | 5/2011 | Wallace et al. | |
| 8,031,130 B2 | 10/2011 | Tamura | |
| 8,077,634 B2 | 12/2011 | Maggenti et al. | |
| 8,325,239 B2 * | 12/2012 | Kaplan et al. | 348/207.1 |
| 2001/0005385 A1 | 6/2001 | Ichiguchi et al. | |
| 2001/0012293 A1 | 8/2001 | Petersen et al. | |
| 2001/0032295 A1 | 10/2001 | Tsai et al. | |
| 2001/0047450 A1 | 11/2001 | Gillingham et al. | |
| 2001/0047475 A1 | 11/2001 | Terasaki | |
| 2001/0053174 A1 | 12/2001 | Fleming et al. | |
| 2002/0011998 A1 * | 1/2002 | Tamura | 345/204 |
| 2002/0045448 A1 | 4/2002 | Park et al. | |
| 2002/0071395 A1 | 6/2002 | Redi et al. | |
| 2002/0131379 A1 | 9/2002 | Lee et al. | |
| 2002/0140845 A1 | 10/2002 | Yoshida et al. | |
| 2002/0146024 A1 | 10/2002 | Harris et al. | |
| 2002/0188907 A1 | 12/2002 | Kobayashi | |
| 2002/0193133 A1 * | 12/2002 | Shibutani | 455/522 |
| 2003/0003943 A1 | 1/2003 | Bajikar et al. | |
| 2003/0028647 A1 | 2/2003 | Grosu | |
| 2003/0033417 A1 * | 2/2003 | Zou et al. | 709/230 |
| 2003/0034955 A1 | 2/2003 | Gilder et al. | |
| 2003/0039212 A1 | 2/2003 | Lloyd et al. | |
| 2003/0061431 A1 | 3/2003 | Mears et al. | |

(56) References Cited

U.S. PATENT DOCUMENTS

| | | | |
|---|---|---|---|
| 2003/0081557 A1* | 5/2003 | Mettala et al. | 370/252 |
| 2003/0086443 A1 | 5/2003 | Beach et al. | |
| 2003/0091056 A1 | 5/2003 | Paul Hulme Walker et al. | |
| 2003/0093607 A1 | 5/2003 | Main et al. | |
| 2003/0125040 A1 | 7/2003 | Walton et al. | |
| 2003/0144006 A1 | 7/2003 | Johansson et al. | |
| 2003/0158979 A1* | 8/2003 | Tateyama et al. | 710/33 |
| 2003/0185220 A1 | 10/2003 | Valenci | |
| 2003/0191809 A1 | 10/2003 | Mosley et al. | |
| 2003/0194018 A1 | 10/2003 | Chang | |
| 2003/0229902 A1* | 12/2003 | Moni | 725/95 |
| 2003/0235209 A1* | 12/2003 | Garg et al. | 370/468 |
| 2004/0008631 A1 | 1/2004 | Kim | |
| 2004/0024920 A1 | 2/2004 | Gulick et al. | |
| 2004/0028415 A1 | 2/2004 | Eiselt | |
| 2004/0049616 A1* | 3/2004 | Dunstan et al. | 710/100 |
| 2004/0073697 A1 | 4/2004 | Saito et al. | |
| 2004/0082383 A1 | 4/2004 | Muncaster et al. | |
| 2004/0100966 A1 | 5/2004 | Allen, Jr. et al. | |
| 2004/0128563 A1 | 7/2004 | Kaushik et al. | |
| 2004/0130466 A1 | 7/2004 | Lu et al. | |
| 2004/0140459 A1 | 7/2004 | Haigh et al. | |
| 2004/0153952 A1 | 8/2004 | Sharma et al. | |
| 2004/0176065 A1 | 9/2004 | Liu | |
| 2004/0184450 A1 | 9/2004 | Omran | |
| 2004/0199652 A1 | 10/2004 | Zou et al. | |
| 2004/0221315 A1 | 11/2004 | Kobayashi | |
| 2004/0260823 A1 | 12/2004 | Tiwari et al. | |
| 2005/0012905 A1 | 1/2005 | Morinaga | |
| 2005/0020279 A1 | 1/2005 | Markhovsky et al. | |
| 2005/0021885 A1 | 1/2005 | Anderson et al. | |
| 2005/0033586 A1* | 2/2005 | Savell | 704/500 |
| 2005/0055399 A1 | 3/2005 | Savchuk | |
| 2005/0088939 A1 | 4/2005 | Hwang et al. | |
| 2005/0091593 A1 | 4/2005 | Peltz | |
| 2005/0108611 A1 | 5/2005 | Vogt et al. | |
| 2005/0117601 A1 | 6/2005 | Anderson et al. | |
| 2005/0120079 A1 | 6/2005 | Anderson et al. | |
| 2005/0120208 A1 | 6/2005 | Dobson et al. | |
| 2005/0125840 A1 | 6/2005 | Anderson et al. | |
| 2005/0135390 A1 | 6/2005 | Anderson et al. | |
| 2005/0138260 A1 | 6/2005 | Love et al. | |
| 2005/0144225 A1 | 6/2005 | Anderson et al. | |
| 2005/0154599 A1 | 7/2005 | Kopra et al. | |
| 2005/0163085 A1 | 7/2005 | Cromer et al. | |
| 2005/0163116 A1 | 7/2005 | Anderson et al. | |
| 2005/0165970 A1 | 7/2005 | Ching et al. | |
| 2005/0184993 A1 | 8/2005 | Ludwin et al. | |
| 2005/0204057 A1* | 9/2005 | Anderson et al. | 709/236 |
| 2005/0213593 A1 | 9/2005 | Anderson et al. | |
| 2005/0216421 A1 | 9/2005 | Barry et al. | |
| 2005/0216599 A1 | 9/2005 | Anderson et al. | |
| 2005/0216623 A1 | 9/2005 | Dietrich et al. | |
| 2005/0248685 A1 | 11/2005 | Seo et al. | |
| 2005/0259670 A1 | 11/2005 | Anderson et al. | |
| 2005/0265333 A1 | 12/2005 | Coffey et al. | |
| 2005/0271072 A1 | 12/2005 | Anderson et al. | |
| 2005/0286466 A1 | 12/2005 | Tagg et al. | |
| 2006/0004968 A1 | 1/2006 | Vogt et al. | |
| 2006/0034301 A1 | 2/2006 | Anderson et al. | |
| 2006/0034326 A1 | 2/2006 | Anderson et al. | |
| 2006/0120433 A1 | 6/2006 | Baker et al. | |
| 2006/0128399 A1 | 6/2006 | Duan et al. | |
| 2006/0161691 A1 | 7/2006 | Katibian et al. | |
| 2006/0164424 A1 | 7/2006 | Wiley et al. | |
| 2006/0168496 A1 | 7/2006 | Steele et al. | |
| 2006/0179164 A1 | 8/2006 | Katibian et al. | |
| 2006/0179384 A1 | 8/2006 | Wiley et al. | |
| 2006/0212775 A1 | 9/2006 | Cypher et al. | |
| 2006/0274031 A1* | 12/2006 | Yuen et al. | 345/156 |
| 2006/0288133 A1 | 12/2006 | Katibian et al. | |
| 2007/0008897 A1 | 1/2007 | Denton et al. | |
| 2007/0073949 A1 | 3/2007 | Fredrickson et al. | |
| 2007/0098002 A1* | 5/2007 | Liu et al. | 370/422 |
| 2007/0274434 A1 | 11/2007 | Arkas et al. | |
| 2008/0036631 A1 | 2/2008 | Musfeldt | |
| 2008/0088492 A1 | 4/2008 | Wiley et al. | |
| 2008/0129749 A1 | 6/2008 | Wiley et al. | |
| 2008/0147951 A1 | 6/2008 | Love | |
| 2008/0282296 A1 | 11/2008 | Kawai et al. | |
| 2009/0055709 A1 | 2/2009 | Anderson et al. | |
| 2009/0070479 A1 | 3/2009 | Anderson et al. | |
| 2009/0290628 A1* | 11/2009 | Matsumoto | 375/225 |
| 2010/0128626 A1 | 5/2010 | Anderson et al. | |
| 2010/0260055 A1 | 10/2010 | Anderson et al. | |
| 2011/0013681 A1 | 1/2011 | Zou et al. | |
| 2011/0022719 A1 | 1/2011 | Anderson et al. | |
| 2011/0199383 A1 | 8/2011 | Anderson et al. | |
| 2011/0199931 A1 | 8/2011 | Anderson et al. | |
| 2012/0008642 A1 | 1/2012 | Katibian et al. | |

FOREIGN PATENT DOCUMENTS

| | | |
|---|---|---|
| CN | 1310400 A | 8/2001 |
| CN | 1377194 A | 10/2002 |
| CN | 1467953 A | 1/2004 |
| CN | 1476268 A | 2/2004 |
| EP | 0594006 A1 | 4/1994 |
| EP | 0872085 | 12/1996 |
| EP | 0850522 A2 | 7/1998 |
| EP | 0896318 | 2/1999 |
| EP | 0969676 | 1/2000 |
| EP | 1217602 A2 | 6/2002 |
| EP | 1309151 | 5/2003 |
| EP | 1423778 A2 | 6/2004 |
| EP | 1478137 A1 | 11/2004 |
| EP | 1544743 A2 | 6/2005 |
| EP | 1580964 A1 | 9/2005 |
| EP | 1630784 | 3/2006 |
| FR | 2729528 A1 | 7/1996 |
| GB | 2250668 A | 6/1992 |
| GB | 2265796 A | 10/1993 |
| JP | 53131709 A | 11/1978 |
| JP | 62132433 A | 6/1987 |
| JP | 64008731 U | 1/1989 |
| JP | 1314022 A | 12/1989 |
| JP | 4167715 A | 6/1992 |
| JP | 4241541 | 8/1992 |
| JP | 5199387 A | 8/1993 |
| JP | 5219141 A | 8/1993 |
| JP | 5260115 A | 10/1993 |
| JP | 6037848 A | 2/1994 |
| JP | 06053973 | 2/1994 |
| JP | 06317829 | 11/1994 |
| JP | 7115352 A | 5/1995 |
| JP | 837490 | 2/1996 |
| JP | H0854481 A | 2/1996 |
| JP | 08-274799 | 10/1996 |
| JP | 09-006725 | 1/1997 |
| JP | 09230837 A | 9/1997 |
| JP | 09261232 | 10/1997 |
| JP | 9270951 A | 10/1997 |
| JP | 9307457 A | 11/1997 |
| JP | 10200941 | 7/1998 |
| JP | 10234038 A | 9/1998 |
| JP | 10312370 A | 11/1998 |
| JP | 1117710 | 1/1999 |
| JP | 11032041 A | 2/1999 |
| JP | 11122234 A | 4/1999 |
| JP | 11163690 A | 6/1999 |
| JP | 11225182 A | 8/1999 |
| JP | 11225372 A | 8/1999 |
| JP | 11249987 | 9/1999 |
| JP | 11282786 A | 10/1999 |
| JP | 11341363 A | 12/1999 |
| JP | 11355327 A | 12/1999 |
| JP | 2000188626 | 7/2000 |
| JP | 2000216843 A | 8/2000 |
| JP | 2000236260 | 8/2000 |
| JP | 2000278141 A | 10/2000 |
| JP | 2000295667 | 10/2000 |
| JP | 2000324135 A | 11/2000 |
| JP | 2000358033 A | 12/2000 |
| JP | 200144960 | 2/2001 |

(56) References Cited

FOREIGN PATENT DOCUMENTS

| | | |
|---|---|---|
| JP | 200194542 | 4/2001 |
| JP | 2001094524 | 4/2001 |
| JP | 2001177746 | 6/2001 |
| JP | 2001222474 A | 8/2001 |
| JP | 2001282714 A | 10/2001 |
| JP | 2001292146 A | 10/2001 |
| JP | 2001306428 | 11/2001 |
| JP | 2001319745 A | 11/2001 |
| JP | 2001320280 | 11/2001 |
| JP | 2001333130 A | 11/2001 |
| JP | 2002500855 A | 1/2002 |
| JP | 2002503065 T | 1/2002 |
| JP | 2002062990 A | 2/2002 |
| JP | 2002208844 A | 7/2002 |
| JP | 2002281007 A | 9/2002 |
| JP | 2002300229 A | 10/2002 |
| JP | 2002300299 A | 10/2002 |
| JP | 2003006143 A | 1/2003 |
| JP | 2003009035 A | 1/2003 |
| JP | 2003044184 A | 2/2003 |
| JP | 2003046595 | 2/2003 |
| JP | 2003046596 A | 2/2003 |
| JP | 2003058271 A | 2/2003 |
| JP | 2003069544 A | 3/2003 |
| JP | 2003076654 A | 3/2003 |
| JP | 2003098583 A | 4/2003 |
| JP | 2003111135 A | 4/2003 |
| JP | 2003167680 | 6/2003 |
| JP | 2003198550 A | 7/2003 |
| JP | 2004005683 A | 1/2004 |
| JP | 2004007356 A | 1/2004 |
| JP | 2004021613 | 1/2004 |
| JP | 2004046324 A | 2/2004 |
| JP | 2004153620 | 5/2004 |
| JP | 2004246023 A | 9/2004 |
| JP | 2004297660 A | 10/2004 |
| JP | 2004531916 T | 10/2004 |
| JP | 2004309623 A | 11/2004 |
| JP | 2004363687 A | 12/2004 |
| JP | 2005107683 A | 4/2005 |
| JP | 2005536167 A | 11/2005 |
| JP | 2005539464 A | 12/2005 |
| KR | 1020060056989 | 5/1999 |
| KR | 199961245 | 9/1999 |
| KR | 1019990082741 | 11/1999 |
| KR | 200039224 | 7/2000 |
| KR | 1999-0058829 | 1/2001 |
| KR | 20010019734 | 3/2001 |
| KR | 20020071226 | 9/2002 |
| KR | 2003-0061001 | 7/2003 |
| KR | 1020047003852 | 5/2004 |
| KR | 2004-69360 | 8/2004 |
| KR | 1020060053050 | 5/2006 |
| KR | 2004-0014406 | 2/2007 |
| RU | 2111619 | 5/1998 |
| RU | 2150791 | 6/2000 |
| RU | 2337497 | 10/2008 |
| RU | 2337497 C2 | 10/2008 |
| TW | 459184 B | 10/2001 |
| TW | 466410 | 12/2001 |
| TW | 488133 B | 5/2002 |
| TW | 507195 | 10/2002 |
| TW | 513636 | 12/2002 |
| TW | 515154 | 12/2002 |
| TW | 529253 | 4/2003 |
| TW | 535372 | 6/2003 |
| TW | 540238 B | 7/2003 |
| TW | 542979 B | 7/2003 |
| TW | 200302008 | 7/2003 |
| TW | 546958 | 8/2003 |
| TW | 552792 B | 9/2003 |
| TW | 200304313 | 9/2003 |
| TW | 563305 B | 11/2003 |
| TW | 569547 B | 1/2004 |
| TW | 595116 B | 6/2004 |
| WO | 9210890 | 6/1992 |
| WO | 9410779 | 5/1994 |
| WO | 9619053 | 6/1996 |
| WO | 96/42158 A1 | 12/1996 |
| WO | 98/02988 A2 | 1/1998 |
| WO | WO9915979 | 4/1999 |
| WO | 9923783 A2 | 5/1999 |
| WO | 0130038 | 4/2001 |
| WO | WO0137484 A2 | 5/2001 |
| WO | WO0138970 A2 | 5/2001 |
| WO | WO0138982 A1 | 5/2001 |
| WO | WO0158162 | 8/2001 |
| WO | 0249314 A1 | 6/2002 |
| WO | WO02098112 | 12/2002 |
| WO | 03023587 A2 | 3/2003 |
| WO | 03040893 | 5/2003 |
| WO | WO03039081 A1 | 5/2003 |
| WO | 03061240 | 7/2003 |
| WO | WO2004015680 | 2/2004 |
| WO | WO2004110021 A2 | 12/2004 |
| WO | WO2005018191 A2 | 2/2005 |
| WO | 2005073955 A1 | 8/2005 |
| WO | 2005088939 | 9/2005 |
| WO | 2005091593 | 9/2005 |
| WO | 2005096594 | 10/2005 |
| WO | 2005122509 | 12/2005 |
| WO | WO2006008067 A1 | 1/2006 |
| WO | 2006058045 | 6/2006 |
| WO | 2006058050 | 6/2006 |
| WO | 2006058052 | 6/2006 |
| WO | 2006058067 | 6/2006 |
| WO | WO2006058045 A2 | 6/2006 |
| WO | WO2006058051 | 6/2006 |
| WO | WO2007051186 | 5/2007 |
| WO | 06058051 | 6/2007 |
| WO | 06058053 | 6/2007 |
| WO | 06058173 | 6/2007 |

OTHER PUBLICATIONS

International search report PCT/US05/042643—International Search Authority—US Oct. 5, 2006.
International search report PCT/US05/042402—International Search Authority—US Feb. 20, 2007.
International search report PCT/US05/042414—International Search Authority—US May 23, 2007.
International search report PCT/US05/042436—International Search Authority—US Oct. 2, 2006.
Plug and Display Standard, Video Electronics Standards Association (VESA) San Jose, CA (Jun. 11, 1997).
Search Report, dated Nov. 8, 2006, for International Application No. PCT/US05/42415, 8 pages.
Video Electronics Standards Association (VESA), "Mobile Display Digital Interface Standard (MDDI)", Jul. 2004.
J. Sevanto, "Multimedia messaging service for GPRS and UMTS", IEEE on WCNC, Sep. 1999, pp. 1422-1426, vol. 3.
Liptak, "Instrument Engineer's Handbook, Third Edition, vol. Three: Process Software and Digital Networks, Section 4.17, Proprietary Networks, pp. 627-637, Boca Raton" CRC Press, Jun. 26, 2002.
VESA Mobile Display Digital Interface, Proposed Standard, Version 1P, Draft 14, Oct. 29, 2003, pp. 76-158.
VESA Mobile Display Digital Interface, Proposed Standard: Version 1P, Draft 10, Aug. 13, 2003, pp. 1-75.
VESA Mobile Display Digital Interface, Proposed Standard: Version 1P, Draft 13, Oct. 15, 2003, pp. 76-154.
VESA Mobile Display Digital Interface, Proposed Standard: Version 1P, Draft 15, Nov. 12, 2003, pp. 1-75.
VESA Mobile Display Digital Interface, Proposed Standard: Version 1P, Draft 15, Nov. 12, 2003, pp. 76-160.
VESA Mobile Display Digital Interface, Proposed Standard; Version 1P, Draft 11, Sep. 10, 2003, pp. 1-75.
VESA Mobile Display Digital Interface, Proposed Standard, Version 1P, Draft 11, Sep. 10, 2003, pp. 76-150.
VESA Mobile Display Digital Interface, Proposed Standard, Version 1P, Draft 13, Oct. 15, 2003, pp. 1-75.

(56) References Cited

OTHER PUBLICATIONS

VESA Mobile Display Digital Interface, Proposed Standard: Version1P, Draft 14, Oct. 29, 2003, pp. 1-75.
"V4400," Product Brochure, May 31, 2004.
"Transmission and Multiplexing; High Bit Rate Digital Subscriber Line (HDSL) Transmission System on Metallic Local Lines; HDSL Core Specification and Applications for 2 048 Kbit/S Based Access Digital Sections; ETR 152" European Telecommunications Standard.
IEEE Std 1394B: IEEE Standard for High Performance Serial Bus—Amendment 2(Dec. 2002).
European Search Report—EP05824686, Search Authority—Hague Patent Office, Jul. 29, 2010.
Written Opinion—PCT/US05/042402, International Search Authority US, Feb. 20, 2007.
Written Opinion PCT/US05/042414, International Search Authority, US May 23, 2007.
Written Opinion PCT/US05/042643, International Search Authority US, Oct. 5, 2006.
International search report and Written Opinion—PCT/US05/042413, International Search Authority—European Patent Office—Aug. 25, 2008.
International Search Report and Written Opinion—PCT/US05/042412, International Search Authority—European Patent Office—Jul. 8, 2008.
International Search Report and Written Opinion—PCT/US05/042415, International Search Authority—European Patent Office—Nov. 8, 2006.
Written Opinion—PCT/US05/042436, International Search Authority—US Oct. 2, 2006.
3GPP2 C.S0047-0. "Link-Layer Assisted Service Options for Voice-over-IP: Header Remover (SO60) and Robust Header Compression (SO61)," Version 1.0, Apr. 14, 2003, pp. 1-36.
Hopkins, K., et al., "Display Power Management," IP.COM Journal; IP.COM Inc., West Henrietta, NY (Mar. 1, 1995), XP013103130, ISSN: 1533-0001, vol. 38 No. 3 pp. 425-427.
Masnick, B. et al., "On Linear Unequal Error Protection Codes," IEEE Transactions on Information Theory, vol. IT-3, No. 4, (Oct. 1, 1967), pp. 600-607.
STMicroelectronics: "STV0974 Mobile Imaging DSP Rev.3", Datasheet internet, (Nov. 30, 2004), XP002619368. Retrieved from the Internet: URL: http://pdf1.alldatasheet.com/datasheet-pdf/view/112376/STMICROELECTRONICS/STV0974.html [retrieved on Jan. 27, 2011], pp. 1-69.
"Universal Serial Bus Specification—Revision 2.0: Chapter 9—USB Device Framework," Universal Serial Bus Specification, Apr. 27, 2000, pp. 239-274, XP002474828.
"Nokia 6255", Retrieved from the Internet: URL: http://nokiamuseum.com/view.php model=6255 [retrieved on Feb. 4, 2012], 2 pgs.
Taiwan Search Report—TW094141287—TIPO—May 5, 2012.
Taiwan Search Report—TW093133101—TIPO—Feb. 2, 2012.
Taiwan Search Report—TW094141284—TIPO—Aug. 21, 2012.
Taiwan Search Report—TW094141288—TIPO—Oct. 9, 2012.

\* cited by examiner

ID FOR DIGITAL
SYSTEMS AND METHODS FOR DIGITAL DATA TRANSMISSION RATE CONTROL

CROSS REFERENCE TO RELATED APPLICATIONS

The present application claims priority under 35 U.S.C. 119 to U.S. Provisional Application No. 60/630,853, entitled MDDI Host Core Design, filed Nov. 24, 2004; U.S. Provisional Application No. 60/631,549, entitled Mobile Display Digital Interface Host Camera Interface Device, filed Nov. 30, 2004; U.S. Provisional Application No. 60/632,825, entitled Camera MDDI Host Device, filed Dec. 2, 2004; U.S. Provisional Application No. 60/632,852, entitled MDDI Host Core and Pathfinder, filed Dec. 2, 2004; U.S. Provisional Application No. 60/633,071, entitled MDDI Overview, filed Dec. 2, 2004; and U.S. Provisional Application No. 60/633,084, entitled MDDI Host Core Pad Design, all of which are hereby expressly incorporated by reference herein in their entireties.

The present application is also related to commonly assigned U.S. patent application Ser. No. 11/285,379, entitled Digital Data Interface Device, filed on Nov. 23, 2005; and to U.S. patent application Ser. No. 11/285,389, entitled Digital Data Interface Device Message Format, both of which are expressly incorporated by reference herein in their entireties.

BACKGROUND OF THE INVENTION

1. Field of the Invention

The present invention relates generally to data communications. More particularly, the invention relates to dynamically adjusting data packet transmission rates and size.

2. Background

Computers, mobile telephones, mobile telephone cameras and video capture devices, personal data assistants, electronic game related products and various video technologies (e.g., DVD's and high definition VCRs) have advanced significantly over the last few years to provide for capture and presentation of increasingly higher resolution still, video, video-on-demand, and graphics images. Combining such visual images with high quality audio data, such as CD type sound reproduction, DVDs, and other devices having associated audio signal outputs, creates a more realistic, content rich, or true multimedia experience for an end user. In addition, highly mobile, high quality sound systems and music transport mechanisms, such as MP3 players, have been developed for audio only presentations to users.

The explosion of high quality data presentation drove the need to establish specialized interfaces that could transfer data at high data rates, such that data quality was not degraded or impaired. One such interface is a Mobile Display Digital Interface (MDDI), used, for example, to exchange high speed data between the lower and upper clamshells of a cellular telephone that has a camera. MDDI is a cost-effective, low power consumption, transfer mechanism that enables very-high-speed data transfer over a short-range communication link between a host and a client. MDDI requires a minimum of just four wires plus power for bi-directional data transfer that with present technology can deliver a maximum bandwidth of up to 3.2 Gbits per second.

While MDDI and other data interfaces can be used to efficiently provide high speed data rates across interfaces, there are increasing needs to optimize performance and more effectively use digital transmission links, such as an MDDI link. Specifically, there is a need to dynamically adjust bandwidth allocation within an MDDI link to adjust for changing latency requirements that depend on the particular operating mode of a device.

SUMMARY OF THE INVENTION

The present invention provides systems and methods for adaptive digital data transmission rate control. A digital data transmission system for adaptively transferring packets over a transmission link includes a client device having a bandwidth control module and a host device coupled to the client device over the transmission link. The host device includes one or more bandwidth control registers and a packet builder. The bandwidth control module determines a packet speed and/or size for packets transmitted from the host device to the client device over the transmission link. Requested packet speed and/or size are stored within bandwidth control registers.

The invention also provides a method for adjusting the transmission rate of packets over a transmission link that couples a client device and a host device within an electronic device. The method includes determining a change of state within the electronic device. Based on the change of state, the client device determines a desired transmission rate and/or packet size. Once a desired transmission rate and/or packet size is determined, the client device transmits the desired transmission rate and/or packet size to the host device. Upon receipt of the desired rate and/or packet size, the host device stores the transmission rate within a register in the host device. When the host device sends a packet to the client device, the host device accesses the register containing the transmission rate and/or packet size and transmits packets with a rate and/or size in accordance with the contents of the register.

In one embodiment the transmission link is an MDDI link. The invention, however, is not limited to MDDI links, and can be used with digital transmission links in which an electronic device changes states, such that dynamically controlling transmission rates and packet sizes to adaptively improve latency will improve overall system performance.

Further embodiments, features, and advantages of the invention, as well as the structure and operation of the various embodiments of the invention are described in detail below with reference to the accompanying drawings.

BRIEF DESCRIPTION OF THE FIGURES

The invention is described with reference to the accompanying drawings. In the drawings, like reference numbers indicate identical or functionally similar elements. The drawing in which an element first appears is indicated by the left-most digit in the corresponding reference number.

DETAILED DESCRIPTION OF THE INVENTION

This specification discloses one or more embodiments that incorporate the features of this invention. The disclosed embodiment(s) merely exemplify the invention. The scope of the invention is not limited to the disclosed embodiment(s). The invention is defined by the claims appended hereto.

The embodiment(s) described, and references in the specification to "one embodiment", "an embodiment", "an example embodiment", etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is understood that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

Figure 1:
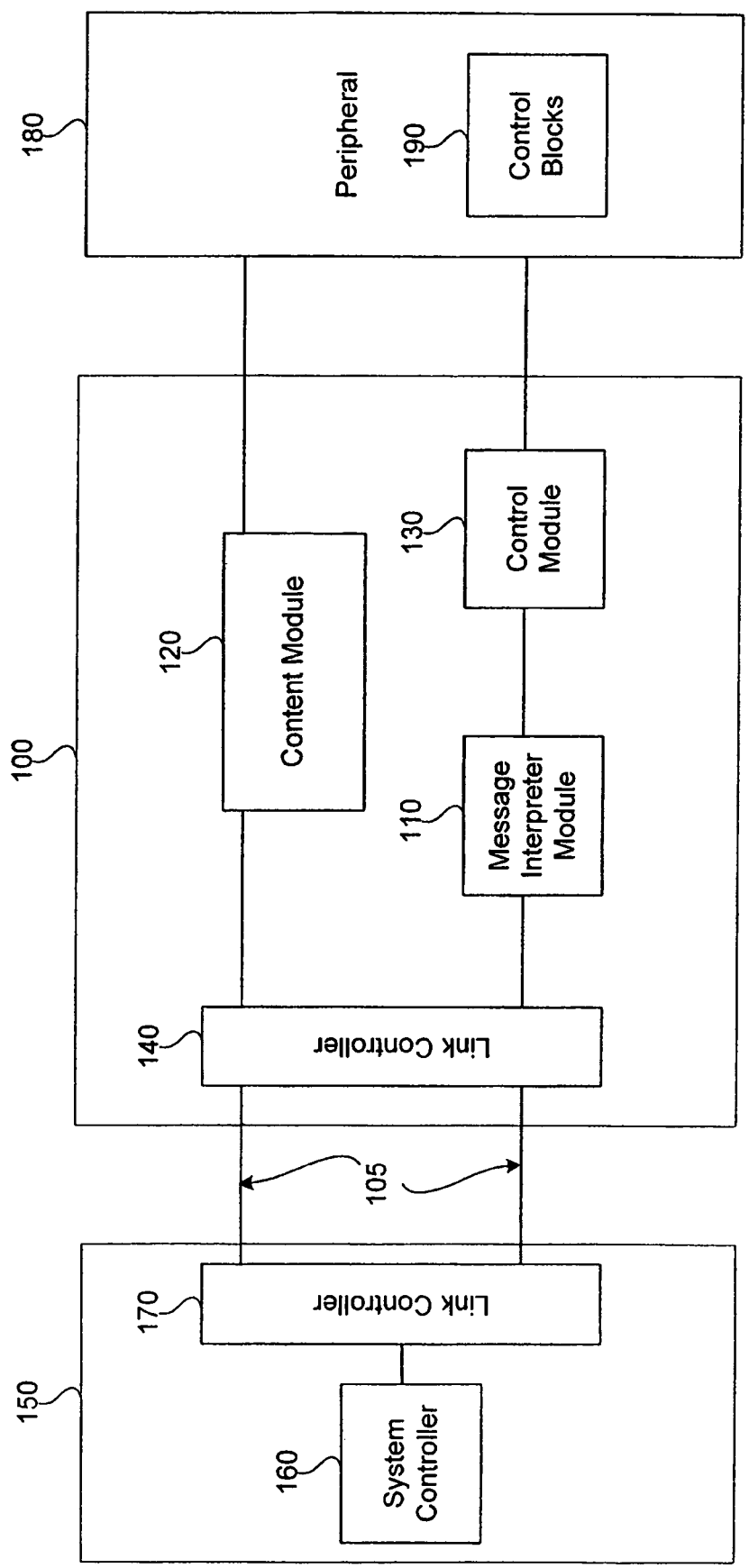
FIG. 1 is a diagram of a digital data device interface coupled to a digital device and a peripheral device.

FIG. 1 is a diagram of a digital data device interface 100 coupled to a digital device 150 and a peripheral device 180. Digital device 150 can include, but is not limited to, a cellular telephone, a personal data assistant, a smart phone or a personal computer. In general digital device 150 can include a digital device that serve as a processing unit for digital instructions and the processing of digital presentation data. Digital device 150 includes a system controller 160 and a link controller 170.

Peripheral device 180 can include, but is not limited to, a camera, a bar code reader, an image scanner, an audio device, and a sensor. In general peripheral 180 can include audio, video or image capture and display devices in which digital presentation data is exchanged between a peripheral and a processing unit. Peripheral 180 includes control blocks 190. When peripheral 180 is a camera, for example, control blocks 190 can include, but are not limited to lens control, flash or white LED control and shutter control. Digital presentation data can include digital data representing audio, image and multimedia data.

Digital data interface device 100 transfers digital presentation data at a high rate over a communication link 105. In one example, an MDDI communication link can be used which supports bi-directional data transfer with a maximum bandwidth of 3.2 Gbits per second. Other high rates of data transfer that are higher or lower than this example rate can be supported depending on the communications link. Digital data interface device 100 includes a message interpreter module 110, a content module 120, a control module 130 and a link controller 140.

Link controller 140, which is located within digital data interface 100, and link controller 170, which is located within digital device 150 establish communication link 105. Link controller 140 and link controller 170 may be MDDI link controllers.

The Video Electronics Standards Association ("VESA") MDDI Standard, which is incorporated herein by reference in its entirety, describes the requirements of a high-speed digital packet interface that lets portable devices transport digital images from small portable devices to larger external displays. MDDI applies a miniature connector system and thin flexible cable ideal for linking portable computing, communications and entertainment devices to emerging products such as wearable micro displays. It also includes information on how to simplify connections between host processors and a display device, in order to reduce the cost and increase the reliability of these connections. Link controllers 140 and 170 establish communication path 105 based on the VESA MDDI Standard.

U.S. Pat. No. 6,760,772, entitled Generating and Implementing a Communication Protocol and Interface for High Data Rate Signal Transfer, issued to Zou et al. on Jul. 6, 2004 ('772 patent") describes a data interface for transferring digital data between a host and a client over a communication path using packet structures linked together to form a communication protocol for presentation data. Embodiments of the invention taught in the '772 patent are directed to an MDDI interface. The signal protocol is used by link controllers, such as link controllers 140 and 170, configured to generate, transmit, and receive packets forming the communications protocol, and to form digital data into one or more types of data packets, with at least one residing in the host device and being coupled to the client through a communications path, such as communications path 105.

The interface provides a cost-effective, low power, bi-directional, high-speed data transfer mechanism over a short-range "serial" type data link, which lends itself to implementation with miniature connectors and thin flexible cables. An embodiment of link controllers 140 and 170 establishes communication path 105 based on the teachings of the '772 patent. The '772 patent is incorporated herein by reference in its entirety.

Furthermore, the host includes one of several types of devices that can benefit from using the present invention. For example, a host could be a portable computer in the form of a handheld, laptop, or similar mobile computing device, such as is depicted in as digital device 150. It could also be a Personal Data Assistant (PDA), a paging device, or one of many wireless telephones or modems. Alternatively, a host device could be a portable entertainment or presentation device such as a portable DVD or CD player, or a game playing device.

Furthermore, the host can reside as a host device or control element in a variety of other widely used or planned commercial products for which a high speed communication link is desired with a client. For example, a host could be used to transfer data at high rates from a video recording device to a storage based client for improved response, or to a high resolution larger screen for presentations. An appliance such as a refrigerator that incorporates an onboard inventory or computing system and/or Bluetooth connections to other household devices, can have improved display capabilities when operating in an internet or Bluetooth connected mode, or have reduced wiring needs for in-the-door displays (a client) and keypads or scanners (client) while the electronic computer or control systems (host) reside elsewhere in the cabinet. In general, those skilled in the art will appreciate the wide variety of modern electronic devices and appliances that may benefit from the use of this interface, as well as the ability to retrofit older devices with higher data rate transport of information utilizing limited numbers of conductors available in either newly added or existing connectors or cables.

At the same time, a client could comprise a variety of devices useful for presenting information to an end user, or presenting information from a user to the host. For example, a micro-display incorporated in goggles or glasses, a projection device built into a hat or helmet, a small screen or even holographic element built into a vehicle, such as in a window or windshield, or various speaker, headphone, or sound systems for presenting high quality sound or music. Other presentation devices include projectors or projection devices used to present information for meetings, or for movies and television images. Another example would be the use of touch pads or sensitive devices, voice recognition input devices, security scanners, and so forth that may be called upon to transfer a significant amount of information from a device or system user with little actual "input" other than touch or sound from the user. In addition, docking stations for computers and car kits or desk-top kits and holders for wireless telephones may act as interface devices to end users or to other devices and equipment, and employ either clients (output or input devices such as mice) or hosts to assist in the transfer of data, especially where high speed networks are involved.

However, those skilled in the art will readily recognize that the present invention is not limited to these devices, there being many other devices on the market, and proposed for use, that are intended to provide end users with high quality images and sound, either in terms of storage and transport or in terms of presentation at playback. The present invention is useful in increasing the data throughput between various elements or devices to accommodate the high data rates needed for realizing the desired user experience.

The inventive MDDI and communication signal protocol may be used to simplify the interconnect between a host processor, controller, or circuit component (for example), and a display within a device or device housing or structure (referred to as an internal mode) in order to reduce the cost or complexity and associated power and control requirements or constraints of these connections, and to improve reliability, not just for connection to or for external elements, devices, or equipment (referred to as an external mode).

Wireless communication devices each have or comprise apparatus such as, but not limited to, a wireless handset or telephone, a cellular telephone, a data transceiver, or a paging or position determination receiver, and can be hand-held, or portable as in vehicle mounted (including cars, trucks, boats, trains, and planes), as desired. However, while wireless communication devices are generally viewed as being mobile, it is also understood that the teachings of the invention are applicable to "fixed" units in some configurations. In addition, the teachings of the invention are applicable to wireless devices such as one or more data modules or modems which may be used to transfer data and/or voice traffic, and may communicate with other devices using cables or other known wireless links or connections, for example, to transfer information, commands, or audio signals. In addition, commands might be used to cause modems or modules to work in a predetermined coordinated or associated manner to transfer information over multiple communication channels. Wireless communication devices are also sometimes referred to as user terminals, mobile stations, mobile units, subscriber units, mobile radios or radiotelephones, wireless units, or simply as 'users' and 'mobiles' in some communication systems, depending on preference.

In the context of wireless devices, the present invention can be used with wireless devices that uses a variety of industry standards, such as, but not limited to cellular Analog Advanced Mobile Phone System (AMPS), and the following digital cellular systems: Code Division Multiple Access (CDMA) spread spectrum systems; Time Division Multiple Access (TDMA) systems; and newer hybrid digital communication systems using both TDMA and CDMA technologies. A CDMA cellular system is described in the Telecommunications Industry Association/Electronic Industries Association (TIA/EIA) Standard IS-95. Combined AMPS & CDMA systems are described in TIA/EIA Standard IS-98. Other communications systems are described in the International Mobile Telecommunications System 2000/Universal Mobile Telecommunications System or IMT-2000/UM standards, covering what are commonly referred to as wideband CDMA (WCDMA), cdma2000 (such as cdma2000 1x-rxtt cdma2000 1x, 3x, or MC standards, for example) or TD-SCDMA. Satellite based communication systems also utilize these or similar known standards.

In other embodiments, link controllers 140 and 170 can both be a USB link controller or they both can include a combination of controllers, such as for example, an MDDI link controller and another type of link controller, such as, for example, a USB link controller. Alternatively, link controllers 140 and 170 can include a combination of controllers, such as an MDDI link controller and a single link for exchanging acknowledgement messages between digital data interface device 100 and digital device 150. Link controllers 140 and 170 additionally can support other types of interfaces, such as an Ethernet or RS-232 serial port interface. Additional interfaces can be supported as will be known by individuals skilled in the relevant arts based on the teachings herein.

Within digital data interface device 100, message interpreter module 110 receives commands from and generates response messages through communication link 105 to system controller 160, interprets the command messages, and routes the information content of the commands to an appropriate module within digital data interface device 100.

Content module 120 receives data from peripheral device 180, stores the data and transfers the data to system controller 160 through communication link 105.

Control module 130 receives information from message interpreter 130, and routes information to control blocks 190 of peripheral device 180. Control module 130 can also receive information from control blocks 190 and routes the information to the message interpreter module 110.

Figure 2:
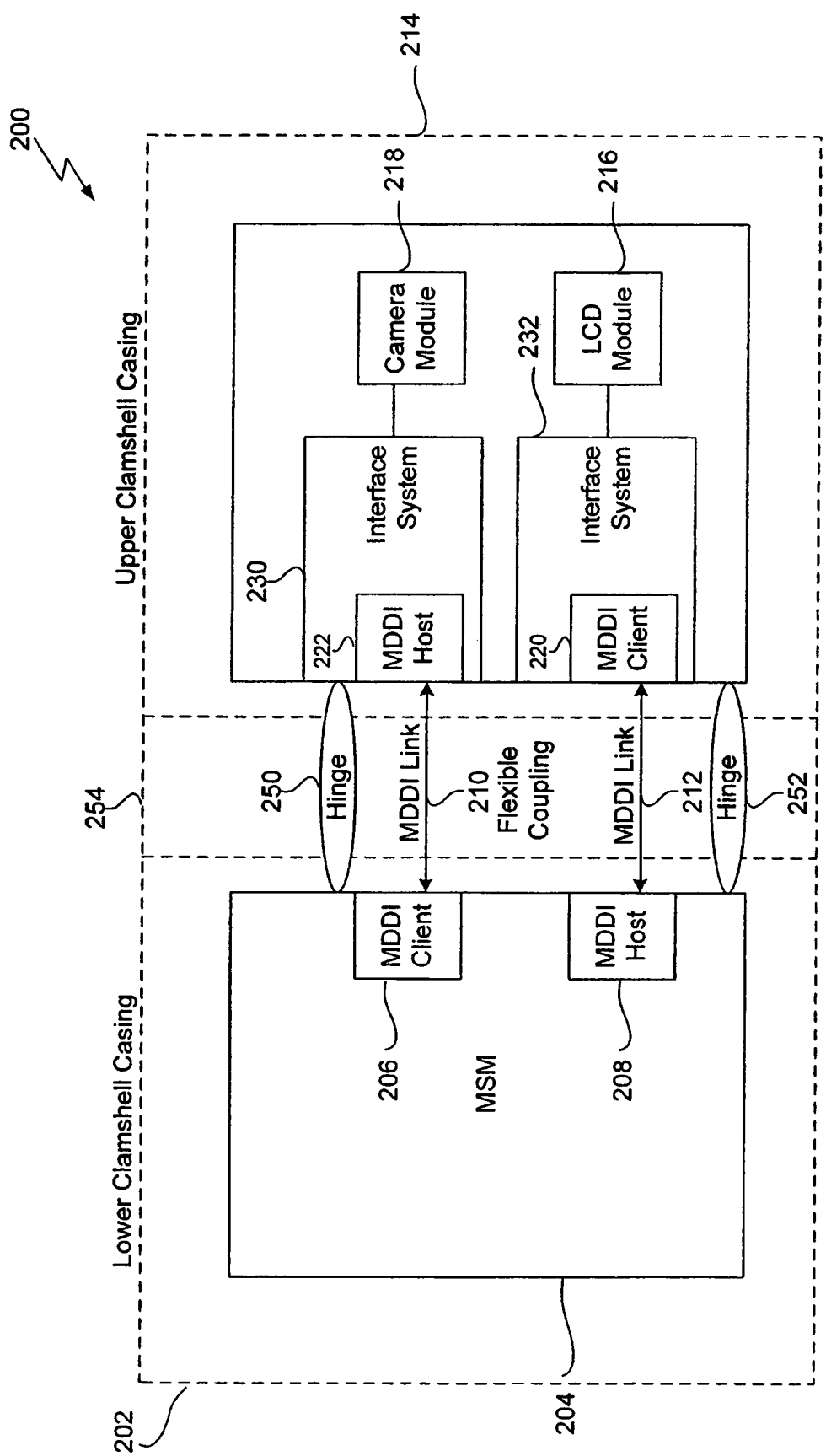
FIG. 2 is a block diagram of a cellular phone having upper and lower clamshell sections that uses an MDDI interface to provide high speed data communications.

FIG. 2 is a block diagram of a cellular telephone 200 having upper and lower clamshell sections that uses an MDDI interface to provide high speed data communications between components located in the upper and lower clamshells. The following discussion related to cellular telephone 200 provides an illustrative example that further shows the utility of digital data interface device 100 and provides additional details related to its implementation and use. Based on the discussions herein, use of a digital data interface device 100 with other devices, for example, a personal digital assistant and other types of mobile phones, will be apparent and are within the spirit and scope of the invention.

Referring to FIG. 2, a lower clamshell section 202 of cellular telephone 200 includes a Mobile Station Modem (MSM) baseband chip 204. MSM 204 is a digital baseband controller. The invention is not limited to use with MSM baseband chip 504. In other embodiments, MSM baseband chip 504 could be another type of baseband processor, programmable digital signal processors (DSPs), or controllers. An upper clamshell section 214 of cellular telephone 200 includes a Liquid Crystal Display (LCD) module 216 and a camera module 218. Both lower clamshell section 202 and upper clamshell section 214 are typically encased in plastic or other protective material, as is typically used with cellular phones, for example. Hinges 250 and 252 mechanically connect lower clamshell 202 to upper clamshell 214. Flexible coupling 254 provides electrical coupling between lower clamshell 202 and upper clamshell 214.

MDDI link 210 connects camera module 218 to MSM 204. In an embodiment, a MDDI link controller is provided for each of camera module 218 and MSM 204. Within cellular telephone 200, for example, an MDDI Host 222 is integrated into interface system 230 which is coupled to camera module 212, while an MDDI Client 206 resides on the MSM side of the MDDI link 210. In an embodiment, the MDDI host is the master controller of the MDDI link.

In cellular telephone 200, pixel data from camera module 218 are received and formatted into MDDI packets by interface system 230 using MDDI Host 222 before being transmitted onto MDDI link 210. MDDI client 206 receives the MDDI packets and re-converts them into pixel data of the same format as generated by camera module 218. The pixel data are then sent to an appropriate block in MSM 204 for processing.

Similarly, MDDI link 212 connects LCD module 216 to MSM 204. MDDI link 212 interconnects an MDDI Host 208, integrated into MSM 204, and an MDDI Client 220 integrated into interface system 232 which is coupled to LCD module 216. Display data generated by a graphics controller of MSM 204 are received and formatted into MDDI packets by MDDI Host 208 before being transmitted onto MDDI link 212. MDDI client 220 receives the MDDI packets and re-converts them into display data and processes the display data through interface system 232 for use by LCD module 216.

Interface systems 230 and 232 represent different embodiments of digital data device interface 100. In the case of interface system 230, digital data device interface 100 elements will be implemented to support data transfer of camera images and camera control functions for a camera. In the case of interface system 232, digital data device interface 100 elements will be implemented to support data display to an LCD and control functions for the LCD. Interface system 230 is further explained to illustrate an embodiment of digital data device interface 100 when used in a cellular telephone with a camera, such as cellular telephone 200 with camera module 218.

The relationship between the devices in FIG. 1 and cellular telephone 200 is as follows. Digital data device interface 100 is represented by interface system 230. Link controller 140 is represented by MDDI Host 222. Peripheral 180 is represented by camera module 218. System controller 160 is represented by MSM 204 and link controller 170 is represented by MDDI client 206.

Figure 3:
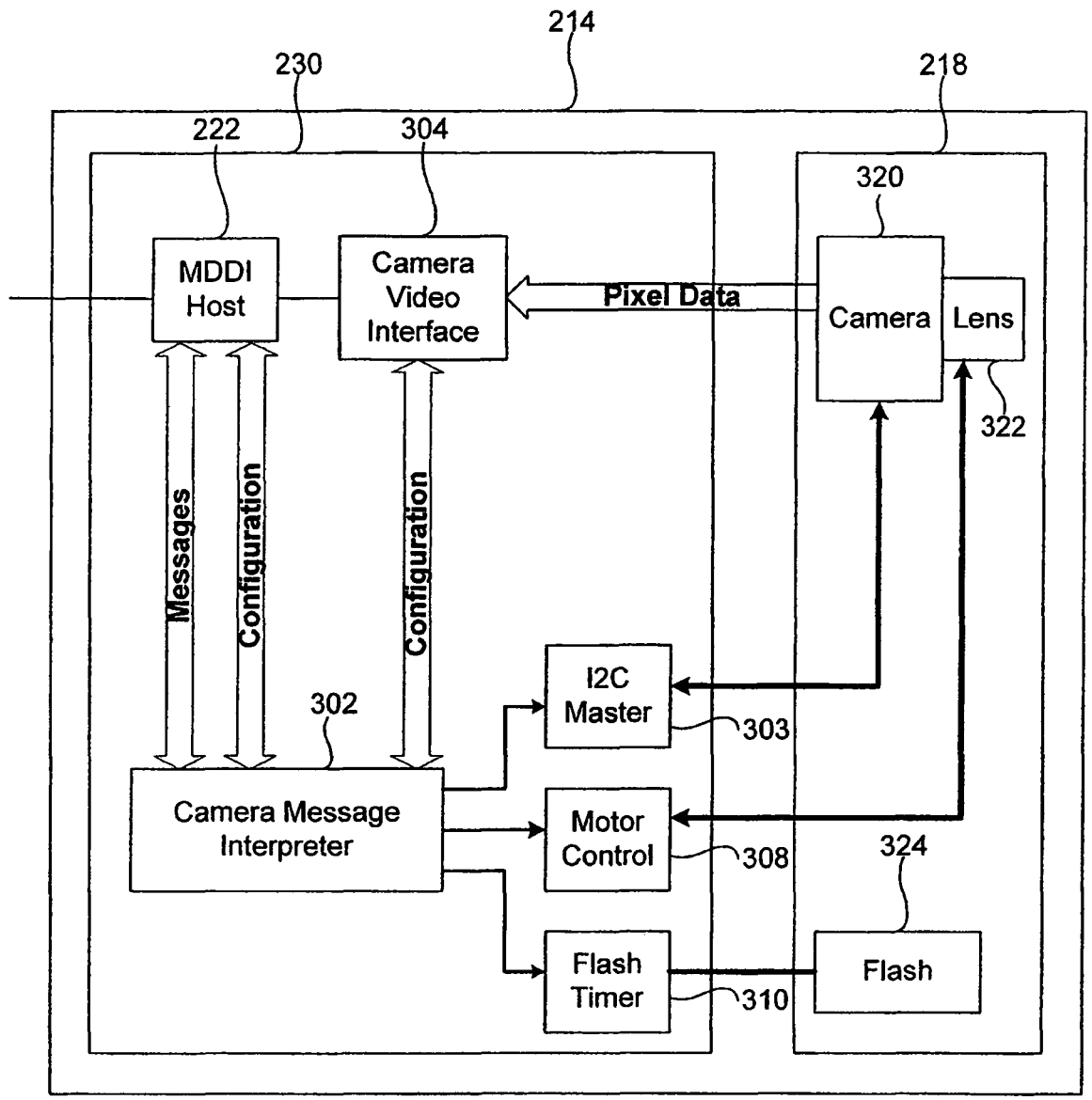
FIG. 3 is a diagram of an upper clamshell of a cellular phone with a camera.

FIG. 3 is a diagram of upper clamshell 214 and provides further details related to interface system 230 to highlight the example embodiment of digital data device interface 100 as used within a cellular telephone with a camera. Interface system 230 includes MDDI host 222, camera message interpreter 302, camera video interface 304, I2C master 303, motor control 308 and flash/white LED timer 310. The I2C bus is a commonly used control bus that provides a communication link between circuits. The I2C bus was developed by Philips Electronics N.V. in the 1980s.

Recall that interface system 230 corresponds to digital data device interface 100. The components of interface system 230 correspond to the components of digital data device interface 100 in the following manner. Camera message interpreter 302 corresponds to message interpreter module 100. Camera video interface 304 corresponds to content module 120. Collectively, I2C master 303, motor control 308 and flash/white LED timer 310 correspond to control module 130.

Camera message interpreter 302 receives commands and generates response messages through MDDI host 222 to MSM 204. Camera message interpreter 302 interprets the messages and routes the information content to the appropriate block within interface system 230, which can be referred to as an MDDI camera interface device. Camera video interface 304 receives image data from camera 320, stores the image data, and transfers the image data to MDDI host 222. Collectively, I2C master 306, motor control 308 and flash/white LED timer 310 form a camera control block. In this case I2C master 306 provide controls for managing camera 320, motor control 308 provides controls for managing lens 322 (e.g., lens zoom functions), and flash/white LED timer 310 provides controls for managing flash/white LED 324 (e.g., flash brightness and duration.)

Figure 4:
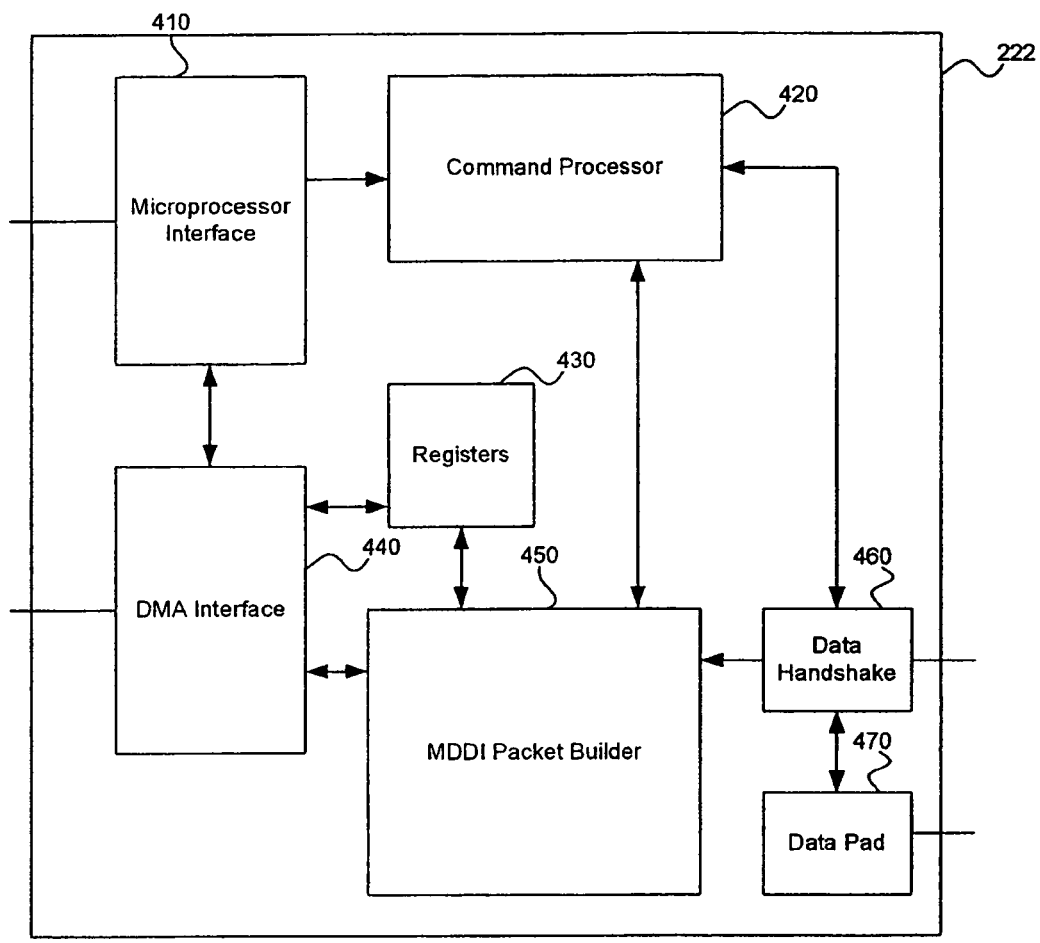
FIG. 4 is a diagram of an MDDI host.

FIG. 4 is a diagram of MDDI Host 222. MDDI Host 222 includes microprocessor interface 410, command processor 420, registers 430, Direct Memory Access (DMA) interface 440, MDDI packet builder 450, data handshake module 460 and data pad 470. Microprocessor interface 410 interfaces with a bus to a host processor that controls MDDI host 222. The host processor uses microprocessor interface 410 to set registers, read registers and issue commands to MDDI host 222. Microprocessor interface 410 looks at address values and passes the data off to the appropriate module within MDDI host 222, including the passing of writes to command processor 420 and reads and writes to registers values within registers 430.

Command processor 420 processes commands received from the host processor. The commands include powering down MDDI link 210, powering MDDI link 210 up, resetting MDDI host 222, and generating certain types of data packets.

Registers 430 store registers for the transmission of data across MDDI link 210. The registers within registers 430 control the behavior of MDDI link 222, as well as the configuration of MDDI host 222.

DMA interface 440 provides burst requests to external memory to receive information from interface system 230 to buffer data for MDDI packet builder 450. DMA interface 440 parses data of link list node headers and adjusts pointers to read the actual packet data. DMA interface 440 presents the information about the next data packet to send out to MDDI packet builder 450.

MDDI packet builder 450 makes decisions about what packet to send next as well as building the physical packets that will need to go over MDDI link 222. The packets are built from internal registers, counters, and data retrieved by DMA interface 440. When data is to be output over MDDI link 222, output data can be generated from several sources. The first source of packets are control type packets that are generated internally to MDDI packet builder 450. Example packets include sub-frame header packets, fill packets and link shut-down packets. Another source of packets is through DMA interface 440. These packets include packets passed via linked lists. In other embodiments video data, when the peripherals include a video camera, can be passed directly to MDDI packet builder 450. Regardless of the source of the packets, all packets are processed through a CRC generator system that resides within MDDI packet builder 450.

Data handshake module 460 manages the physical MDDI link 210. This is accomplished with a state machine that is responsible for the handshaking process, data output, round trip delay measurements and reverse data. Data handshake module 460 receives data from MDDI packet builder 450 and pass the data out to data pad 470, which shifts the data out onto MDDI link 222.

Figure 5:
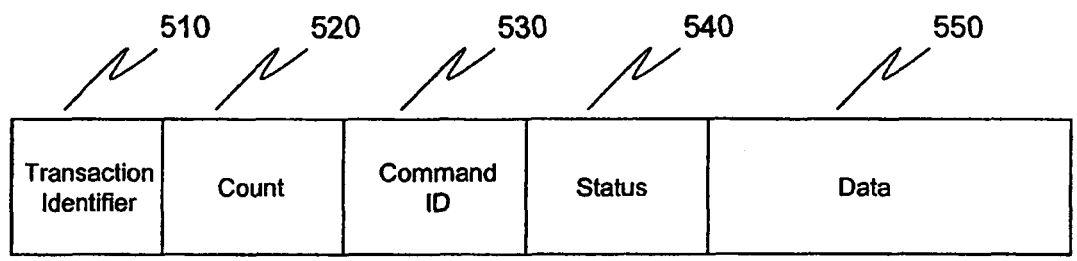
FIG. 5 is a diagram of a digital data interface device message format.

Digital data interface 100 constructs packets having digital data interface device message format as shown in FIG. 5. Digital data interface device message format 500 can be used, for example, to format messages that exchange information and commands between digital data interface device 100 and digital device 150. Message format 500 includes a transaction identifier field 510, a count field 520, a command identification field 530, a status field 540, and a data field 550. In one example, transaction identifier field 510, count field 520, command identification field 530, and status field 540 are each one byte. Data field 550 is an optional field that may or may not be present. When present data field 550 is either four or eight bytes. In other examples the field sizes can be other lengths, depending on specific messaging needs. The field size uses an 8-bit format for each byte. In other examples, the bit format can include other formats, such as, for example, a 4-bit or 16-bit format.

Using the above message formats, command and response messages can be formatted. There are two types of command messages: a write command and a read command. A write command is a message to execute a command, and a read command is a message to read information from one or more registers. There are three types of response messages: a write acknowledgment, a read response and an unsolicited message. A write acknowledgment is a response message indicating a successful register access. A read response message contains information that was read from one or more registers. In some instances a read response message can contain status indicators or signals that were not stored in a register. An unsolicited message is generated by, for example, digital data interface device 100 without a request by system controller 160.

When communications link 105 is an MDDI link, digital data device interface messages can be encapsulated within MDDI register access packets. Register access packets are defined within the VESA MDDI standard. When encapsulated within register access packets, the messages are referred to as reversed encapsulated messages.

Figure 6:
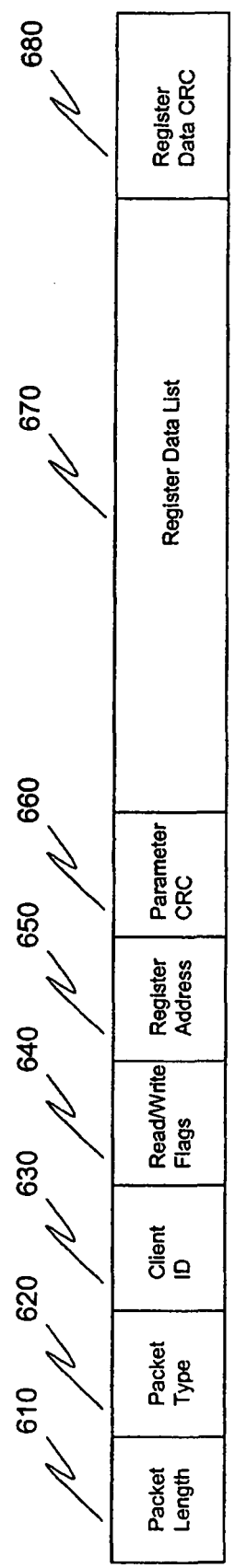
FIG. 6 is a diagram of a register access packet used for reverse encapsulation messages.

FIG. 6 shows a register access packet format 600. Register access packet format 600 includes a packet length field 610, a packet type field 620, a client ID field 630, a read/write flag field 640, a register address field 650, a parameter cyclic redundancy check ("CRC") field 660, a register data list field 670 and a register data CRC field 680. With the exception of register address field 650 and register data list field 670, each field is two bytes. Register address field 650 is four bytes. The register data list field 670 is fourteen bytes. A digital data device interface message conforming to digital data device interface message format 500 can be encapsulated in register data list field 670. The specific uses of the other fields are not germane to the present invention, and are described more fully in the VESA MDDI standard.

In general, digital data interface device 100 receives commands from system controller 160 through MDDI reverse encapsulation packets. The command IDs are embedded in the packet and decoded by message interpreter module 110. The content of the commands is then sent to the appropriate block within digital data interface device 100. Similarly, message interpreter module 110 is also responsible for constructing the response messages to the system controller 160. These messages are either a response to a specific command of system controller 160, such as for example, image data that is to be sent, or an unsolicited message generated by digital data interface device 100 or peripheral device 180.

The use of an MDDI message to encapsulate a digital data device interface message is intended to provide an example of how digital data device interface messages can be encapsulated in other existing message types, and is not intended to limit the invention. Based on the teachings herein, individuals skilled in the relevant arts will be able to determine how to encapsulate digital data interface device messages into other types of messages.

In certain situations it is desirable to dynamically adjust the bandwidth of link 105 from link controller 140 to link controller 170. For example, it may be desirable to adjust the rate of traffic on communications link 105 to minimize latency of control messages from digital device 150 to digital interface device 100, when there is less need to transfer image information from peripheral 180 to digital device 150.

For example, when peripheral 180 is a camera and digital device 150 is MSM 204 as illustrated in FIG. 2 there can be at least three states for the MSM 204, including image preview mode, image capture mode and a hibernation mode. In image preview mode, a user of cellular phone 200 is previewing an image being photographed. During image preview mode, MDDI host 222 sends fewer pixels from camera module 218 to MSM 204 than when in image capture mode. MSM 204 only needs a subset of pixels in image preview mode to be able to make determinations related to how to adjust the auto focus, light balance, exposure and the like.

Because the system needs to make very quick adjustments and send the adjustments back to camera module 218, a short latency time is needed for sending control messages that impact focus, light balance and exposure times, for example. One way to improve latency is for MDDI Host 222 to send fewer pixels, thereby freeing up bandwidth to send control signals from MDDI client 206 to MDDI host 222. The present invention can provide instructions to send fewer pixels. However, in addition, the present invention allows digital data device 150 to dynamically allocate forward and reverse bandwidth across communication link 105 to provide shortened latency periods for commands or data messages in which ensuring a low latency is most important for a particular mode of operation.

Figure 7:
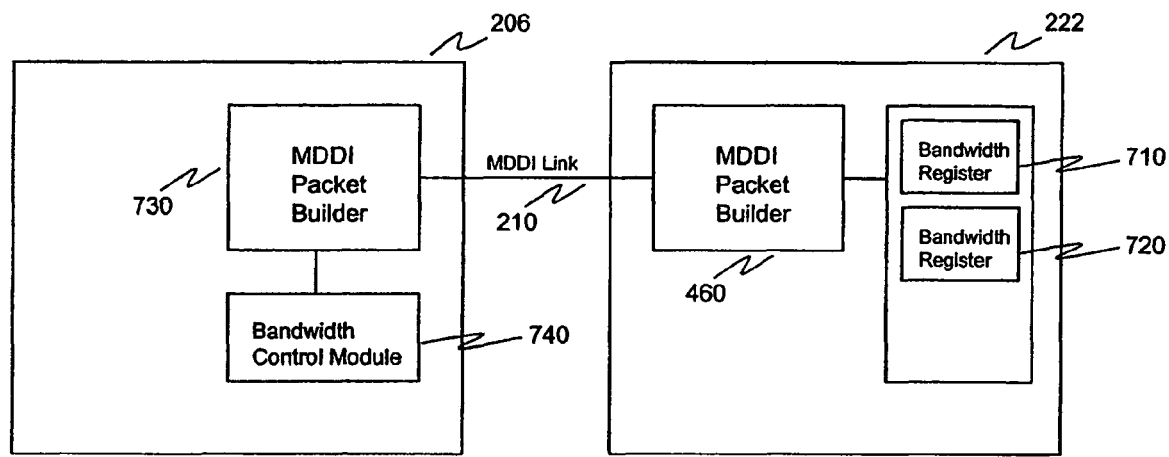
FIG. 7 is a diagram of the control blocks for dynamically adapting the bandwidth across a transmission link.

FIG. 7 illustrates the control blocks for dynamically adapting the bandwidth across communications link 210. FIG. 7 highlights MDDI client 206 coupled to MDDI host 222 over MDDI link 210. MDDI client 206 includes MDDI packet builder 730 and bandwidth control module 740. Additionally, although not shown in FIG. 7 for ease of illustration, MDDI client 206 will include the same elements as shown in FIG. 4 for MDDI host 222.

Bandwidth control module 740 determines the current state of operation of a device. For example, bandwidth control module 740 determines whether device 200 is in image preview mode, image capture mode or hibernation mode. Based on the determination of the mode, bandwidth control module 740 provides instructions to MDDI packet builder 740 to transmit a packet speed and/or packet size request to the MDDI Host 222.

In FIG. 7, only MDDI packet builder 450 and registers 430 are shown within MDDI host 222 for ease of illustration. Registers 430 include bandwidth registers 710 and 720, which are used to control the data rate for reverse encapsulation data packets and the size of reverse encapsulation data packets that are to be sent from MDDI host 222 to MDDI client 206, respectively. When MDDI host 222 receives a packet speed or packet size request from MDDI client 206, MDDI host 222 stores the packet speed information in bandwidth register 710 and the packet size in bandwidth register 720. MDDI packet builder 460 uses the information stored in bandwidth registers 710 and 720 to determine the size and speed of packets sent to MDDI client 206.

Figure 8:
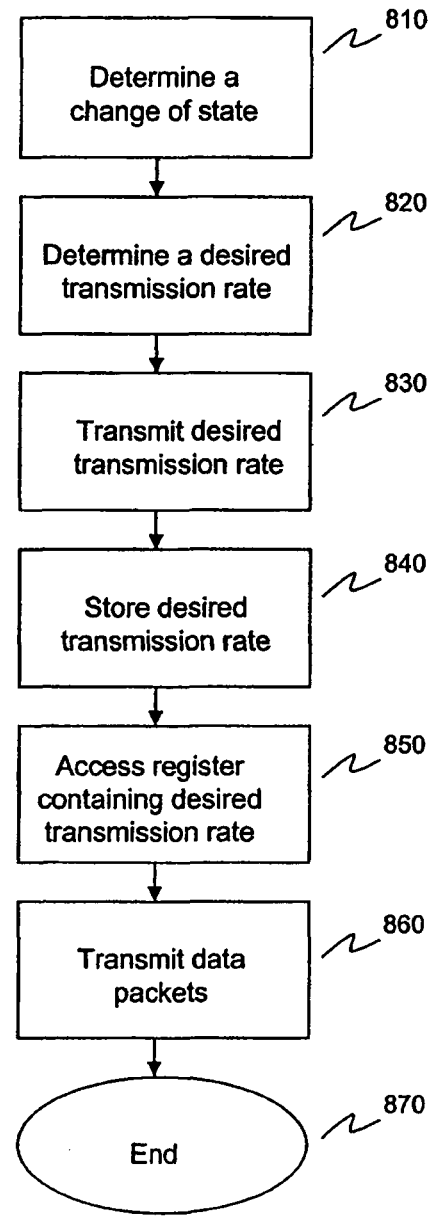
FIG. 8 is a flowchart of a method for adjusting the transmission rate of packets over a transmission link that couples a client device to host device within an electronic device.

FIG. 8 provides a flowchart of method 800 for adjusting the transmission rate of packets over a transmission link that couples a client device to a host device within an electronic device. Method 800 begins in step 810. In step 810, a change in the state of the electronic device is determined. For example, MDDI Client 206 determines that the state of the device has changed from image capture mode to image preview mode.

In step 820, a desired transmission rate is determined. For example, bandwidth control module 740 can determine the packet speed for packets to be sent from MDDI host 222 to MDDI client 206 over MDDI link 210. The determination of the packet rates and sizes can be based on the system's understanding of the latency requirements for commands within a particular state of the electronic device. Alternatively, a desired packet size can be determined or a desired packet size and desired transmission rate can be determined.

In step 830 the desired transmission rate is transmitted from a client device to a host device. For example, MDDI client 206 transmits the desired transmission rate to MDDI host 222. Alternatively, MDDI client 206 can transmit a desired transmission rate and/or desired packet size.

In step 840, the desired transmission rate is stored. For example, MDDI host 222 stores the desired transmission rate in bandwidth register 710.

In step 850, the desired transmission rate is accessed. For example, MDDI packet builder 460 accesses the contents of bandwidth register 710 to determine a desired transmission rate. Alternatively, MDDI packet builder 460 can access the contents of bandwidth register 710 and/or 720 to access a desired transmission rate and packet size.

In step 860, data packets are transmitted with the desired transmission rate. For example, MDDI host 222 transmits reverse encapsulation data packets over MDDI link 210 to MDDI client 206 using the transmission rate obtained from bandwidth register 710. Alternatively, the data packets transmitted can use the transmission rate obtained from bandwidth register 710 and/or can be sized based on the desired packet size contained in bandwidth register 720. In step 870, method 800 ends.

Exemplary embodiments of the present invention have been presented. The invention is not limited to these examples. These examples are presented herein for purposes of illustration, and not limitation. Alternatives (including equivalents, extensions, variations, deviations, etc., of those described herein) will be apparent to persons skilled in the relevant art(s) based on the teachings contained herein. Such alternatives fall within the scope and spirit of the invention.

All publications, patents and patent applications mentioned in this specification are indicative of the level of skill of those skilled in the art to which this invention pertains, and are herein incorporated by reference to the same extent as if each individual publication, patent or patent application was specifically and individually indicated to be incorporated by reference.

What is claimed is:

1. A method for adjusting the transmission rate of packets over a transmission link that couples a client device and a host device within an electronic device, comprising:
   determining a change of state within the electronic device, wherein the change of state includes changing to any of an image preview mode, an image capture mode or a device off hibernation mode;
   dynamically determining a desired transmission rate by the client device, based on the determined change of state;
   transmitting the desired transmission rate from the client device to the host device;
   storing the desired transmission rate received from client device within a register in the host device;
   accessing the register containing the desired transmission rate;
   transmitting data packets over the transmission link from the host device to the client device with a transmission rate that equals the desired transmission rate stored in the register.

2. The method of claim 1, wherein said link is a mobile display digital data interface (MDDI) link.

3. The method of claim 2, wherein the electronic device is a cellular telephone having a camera module.

4. A method for adjusting the size of packets transmitted over a transmission link that couples a client device and a host device within an electronic device, comprising:
   determining a change of state within the electronic device, wherein the states comprise an image preview mode, an image capture mode or and a device off hibernation mode;
   dynamically determining a desired packet size, based on the determined change of state;
   transmitting the desired packet size from the client device to the host device;
   storing the desired packet size received from the client device within a register in the host device; and
   accessing the register containing the desired packet size; and
   transmitting data packets over the transmission link from the host device to the client device with a packet size that equals the desired packet size stored in the register.

5. The method of claim 4, wherein said link is a mobile display digital interface (MDDI) link.

6. The method of claim 5, wherein the electronic device is a cellular telephone having a camera module.

7. The method of claim 4 wherein the bandwidth register includes a register for storing a transmission rate and a packet size register for storing the packet size received from the client device.

8. A method for adjusting the transmission rate of packets over a transmission link that couples a digital data processing device within an electronic device, and a peripheral device, comprising:
   determining a change of state of the electronic device to any of at least an image preview mode and an image capture mode;
   dynamically determining at least one of a desired transmission rate or a desired packet size by the digital data processing device, based on the determined change of state;
   transmitting the determined at least one of a desired transmission rate or a desired packet size from the digital data processing device to the peripheral device;
   storing the at least one of a desired transmission rate received from the digital data processing device or a desired packet size received from the digital data processing device within a register in the peripheral device;
accessing the register containing the at least one of a desired transmission rate received from the digital data processing device or a desired packet size received from the digital data processing device; and
transmitting data packets over the transmission link from the peripheral device to the digital data processing device at least one of a transmission rate that equals a desired transmission rate received from the peripheral device and stored in the register or a packet size that equals a desired packet size received from the peripheral device and stored in the register.

\* \* \* \* \*